(12) United States Patent
Bilodeau

(10) Patent No.: US 10,933,686 B2
(45) Date of Patent: Mar. 2, 2021

(54) DECORATIVE PANEL HAVING A DIGITALLY PRINTED PATTERN

(71) Applicant: MAAX Bath Inc., Lachine (CA)

(72) Inventor: Yan Bilodeau, Sainte-Marie (CA)

( * ) Notice: Subject to any disclaimer, the term of this patent is extended or adjusted under 35 U.S.C. 154(b) by 260 days.

(21) Appl. No.: 15/620,233

(22) Filed: Jun. 12, 2017

(65) Prior Publication Data

US 2017/0274702 A1    Sep. 28, 2017

Related U.S. Application Data

(62) Division of application No. 14/335,872, filed on Jul. 18, 2014.

(60) Provisional application No. 61/856,150, filed on Jul. 19, 2013.

(51) Int. Cl.
| | |
|---|---|
| *B44F 9/00* | (2006.01) |
| *B44F 5/00* | (2006.01) |
| *B44F 9/04* | (2006.01) |
| *B44C 1/00* | (2006.01) |
| *B44C 5/04* | (2006.01) |
| *B29C 37/00* | (2006.01) |
| *E04C 2/00* | (2006.01) |

(52) U.S. Cl.
CPC ............ *B44F 9/00* (2013.01); *B29C 37/0025* (2013.01); *B44C 1/00* (2013.01); *B44C 5/0446* (2013.01); *B44F 5/00* (2013.01); *B44F 9/04* (2013.01); *E04C 2002/007* (2013.01); *E04C 2002/008* (2013.01); *Y10T 428/24355* (2015.01); *Y10T 428/24802* (2015.01); *Y10T 428/24868* (2015.01)

(58) Field of Classification Search
CPC ..... Y10T 428/24802; Y10T 428/24868; B44F 5/00; B44F 9/00; B44F 9/04
See application file for complete search history.

(56) References Cited

U.S. PATENT DOCUMENTS

| | | |
|---|---|---|
| 3,519,527 A | 7/1970 | Crowley |
| 3,772,138 A | 11/1973 | Witman |
| 3,811,915 A | 5/1974 | Burrell et al. |
| 4,097,635 A | 6/1978 | Sanz Hernandez et al. |
| 4,169,907 A | 10/1979 | Barker et al. |
| 4,187,131 A | 2/1980 | Shortway et al. |

(Continued)

FOREIGN PATENT DOCUMENTS

| | | |
|---|---|---|
| CA | 1243925 A | 11/1988 |
| CN | 2497994 Y | 7/2002 |

(Continued)

OTHER PUBLICATIONS

"Tile-Look FRP," <www.frpdesignsolutions.com>, Crane Composites, Inc., 2011.

*Primary Examiner* — Gerard Higgins
(74) *Attorney, Agent, or Firm* — Bradley Arant Boult Cummings; Timothy L. Capria; Alexandra C. Lynn

(57) ABSTRACT

Disclosed is a method of producing a pattern for a decorative panel. The method includes applying a clear gel coat on a mold to form a clear layer. The clear layer is cured and then digitally printed with one or more inks so as to produce a pattern on the clear layer. Also disclosed is a decorative panel including a clear layer, an opaque layer and a pattern digitally printed on the clear layer, between the clear and opaque layers, such that the pattern is visible through the clear layer.

20 Claims, 11 Drawing Sheets

(56) References Cited

U.S. PATENT DOCUMENTS

| | | | |
|---|---|---|---|
| 4,214,028 A | 7/1980 | Shortway et al. | |
| 4,217,385 A | 8/1980 | Shortway et al. | |
| 4,225,374 A * | 9/1980 | Kaufmann | B32B 37/26 |
| | | | 156/220 |
| 4,248,922 A | 2/1981 | Shortway et al. | |
| 4,329,822 A | 5/1982 | Russell | |
| 4,446,177 A | 5/1984 | Munoz et al. | |
| 4,500,373 A | 2/1985 | Kubota | |
| 4,579,767 A | 4/1986 | Coggan et al. | |
| 4,581,255 A | 4/1986 | Coggan et al. | |
| 5,052,160 A | 10/1991 | Gentsch et al. | |
| 5,270,097 A * | 12/1993 | Amemiya | B41M 3/06 |
| | | | 428/151 |
| 5,304,272 A * | 4/1994 | Rohrbacker | B32B 27/30 |
| | | | 156/209 |
| 5,634,307 A | 6/1997 | Larriberot et al. | |
| 5,866,225 A | 2/1999 | Crossley | |
| 5,919,554 A | 7/1999 | Watterson, III et al. | |
| 6,106,952 A | 8/2000 | Yamashita et al. | |
| 6,117,384 A | 9/2000 | Laurin et al. | |
| 6,150,009 A | 11/2000 | Stecker | |
| 6,486,903 B1 | 11/2002 | Wagner et al. | |
| 6,835,420 B1 | 12/2004 | Rockrath et al. | |
| 7,131,380 B2 | 11/2006 | Huffer | |
| 2001/0002293 A1 | 5/2001 | Eby et al. | |
| 2001/0055662 A1 | 12/2001 | Fusco | |
| 2002/0127372 A1* | 9/2002 | Waite | B32B 23/08 |
| | | | 428/172 |
| 2002/0146954 A1 | 10/2002 | Drees et al. | |
| 2002/0160680 A1 | 10/2002 | Laurence et al. | |
| 2003/0086603 A1 | 5/2003 | Davidson et al. | |
| 2003/0113520 A1 | 6/2003 | Takahashi et al. | |
| 2003/0138617 A1 | 7/2003 | Courtoy et al. | |
| 2003/0180509 A1 | 9/2003 | Wright et al. | |
| 2004/0170873 A1 | 9/2004 | Smith | |
| 2004/0219339 A1 | 11/2004 | Dempsey et al. | |
| 2005/0055931 A1 | 3/2005 | Rochette | |
| 2005/0227006 A1 | 10/2005 | Segall | |
| 2006/0000173 A1 | 1/2006 | Edstrom | |
| 2006/0068213 A1 | 3/2006 | O'Brien et al. | |
| 2006/0136083 A1 | 6/2006 | Hansson et al. | |
| 2007/0187864 A1 | 8/2007 | Mincey et al. | |
| 2007/0202305 A1 | 8/2007 | Sun | |
| 2008/0115437 A1 | 5/2008 | Bordener | |
| 2009/0068418 A1 | 3/2009 | Iwase et al. | |
| 2010/0151225 A1 | 6/2010 | Mabey | |
| 2011/0223389 A1 | 9/2011 | Lin et al. | |
| 2014/0120329 A1 | 5/2014 | Hu et al. | |

FOREIGN PATENT DOCUMENTS

| | | | |
|---|---|---|---|
| EP | 2175082 A1 | 4/2010 | |
| FR | 1471270 A | 3/1967 | |
| GB | 1388536 A | 3/1975 | |
| GB | 2428406 A | 1/2007 | |
| WO | WO-9626987 A1 * | 9/1996 | ........... C09D 175/16 |
| WO | 2009/124434 A1 | 10/2009 | |

* cited by examiner

DECORATIVE PANEL HAVING A DIGITALLY PRINTED PATTERN

CROSS-REFERENCE TO RELATED APPLICATIONS

This application is a divisional of copending application U.S. Ser. No. 14/335,872, filed on Jul. 18, 2014, which claims the benefit of and priority to U.S. provisional patent application No. 61/856,150, filed Jul. 19, 2013, the contents of which are hereby incorporated by reference.

TECHNICAL FIELD

The present invention relates to decorative panels, and more particularly to decorative panels having a digitally printed pattern and a method for printing same.

BACKGROUND

Decorative panels and tiles are commonly used to cover floors, walls or even shower walls for example. Tiles are usually secured on a surface using glue and cement and grout is used to fill up space between the tiles. In most instances, grout lines are visible between the tiles after the tiles have been installed.

Installing tiles may be relatively expensive, labor intensive and/or time consuming. Accordingly, decorative panels are sometimes provided as an alternative. This type of panels typically comprises a face which lies against the wall of a structure and an opposite decorative face in which a plurality of grooves or recesses are defined to simulate grout lines or other indented patterns or textures.

Different alternatives have been proposed to manufacture indented decorative panels. For instance, United States patent application published under No. 2008/0115437 to Bordener discloses an indented panel manufactured using a base panel made of plastic resin in which are created a plurality of indented grid lines using a cutting tool such as a router. U.S. Pat. No. 5,052,160 to Gentsch et al. discloses a similar panel, except that the indented lines are created in the plastic resin using a tubular heater instead of a cutting tool. U.S. Pat. No. 4,169,907 to Barker et al. discloses a panel comprising a hardboard substrate on which a pattern is drawn using ink. A liquid top coat is then applied over the ink and the hardboard substrate. The ink repels the liquid top coat to form "valleys" on the panel. Since the liquid top coat is thinner over the portions of the substrate which are covered in ink, the ink is visible through the top coat.

Other types of decorative panels can also be used. For example, solid surface panels, such as cultured marble panels or cultured granite panels, are sometimes used to imitate a natural smooth or textured surface. These panels can be manufactured by molding resin, which may be mixed with pigments and/or fillers.

The manufacturing of most of these panels is relatively expensive, relatively complicated, relatively labor intensive and/or relatively time consuming. Furthermore, the panels manufactured using such methods are often disregarded as being true alternative to the surface they are aimed to imitate because of their unnatural visual appearance.

There is therefore a need for a decorative panel that has a natural visual appearance and for a method for manufacturing such a panel which is relatively inexpensive, relatively easy and relatively fast.

Features of the invention will be apparent from review of the disclosure, drawings and description of the invention below.

BRIEF SUMMARY

We have developed a method of digitally printing a pattern onto a panel, which is considerably more accurate than conventional methods because the inks used may be applied with more precision than conventional methods.

According to one aspect, there is provided a method of producing a pattern for a decorative panel, the method comprising:
  applying a first gel coat on a mold to form a first layer, the first gel coat and the first layer being clear;
  curing the first layer;
  digitally printing one or more inks onto the cured first layer to produce a first pattern thereon.

In one example, the mold has a second pattern thereon, the first pattern printed on the first layer matching the second pattern.

In one example, the first layer is cured by exposing the first layer to electron beam, ultraviolet light or heat, or is cured by the previous addition of a catalyst. A combination of any previous can also be used.

In one example, the method further comprises curing the printed one or more inks.

In one example, the one or more inks are cured by exposing the inks to ultraviolet light.

In one example, the first gel coat is applied by spraying the first gel coat over substantially the entire surface of the mold.

In one example, the mold includes a textured surface, the first layer being formed on the textured surface.

In one example, the first pattern matches the textured surface.

In another example, the mold includes a smooth surface.

In one example, the method further comprises applying a second gel coat on the digitally printed first layer to form a second layer on the digitally printed first layer.

In one example, the second gel coat and the second layer are opaque.

In one example, the second layer is applied by spraying the second gel coat over substantially the entire surface of the digitally printed first layer.

In one example, the method further comprises curing the second layer.

In one example, a catalyst is mixed in the second gel coat so as to activate the curing of the second layer.

In one example, the first layer has a thickness ranging from 0.001 to 0.100 inches (0.0254 mm to 2.54 mm). In another example, the first layer has a thickness ranging from 0.005 to 0.03 inches (0.127 mm to 0.761 mm). In yet another example, first layer has a thickness ranging from 0.01 to 0.02 inches (0.254 mm to 0.508 mm). In a preferred example, the first layer has a thickness of about 0.014 inches (0.356 mm).

In one example, the second layer has a thickness ranging from 0 to 0.05 inches (0 mm to 1.27 mm). In another example, the second layer has a thickness ranging from 0.005 to 0.03 inches (0.127 mm to 0.761 mm). In yet another example, the second layer has a thickness ranging from 0.01 to 0.02 inches (0.254 mm to 0.508 mm). In a preferred example, the second layer a thickness of about 0.015 inches (0.381 mm).

In one example, the curing of the second layer takes place for about 30 to 50 minutes.

In another example, the curing of the second layer takes place for about 40 minutes.

In one example, a digital printer is pre-programmed to apply the inks to match the second pattern on the mold.

In one example, the method further comprises applying reinforcement material on the second layer to form a reinforcement layer on the second layer.

In one example, the reinforcement material is applied by spraying the reinforcement material over substantially the entire surface of the second layer.

According to another aspect, there is also provided a decorative panel comprising:
- a first layer defining a front of the decorative panel, the first layer being clear;
- a second layer covering substantially the entire surface of the first layer;
- a first pattern located between the first and second layer, the first pattern being digitally printed on one of the first layer or the second layer and being visible through the first layer.

In one example, the second layer is opaque.

In one example, the decorative panel further comprises a reinforcement layer covering substantially the entire surface of the second layer.

In one example, the first and second layers define a textured surface.

In another example, the first and second layers define a substantially smooth surface.

In one example, the first pattern imitates the appearance of a natural material.

In another example, the first pattern imitates the appearance of a manmade design.

In one example, the manmade design is selected from a group comprising a tiled surface, brickwork and a stone wall surface.

In one example, the first layer has a matt or a glossy finish. In another example, the first layer has a partially matt or a partially glossy finish.

BRIEF DESCRIPTION OF THE DRAWINGS

In order that the herein described may be readily understood, embodiments are illustrated by way of example in the accompanying figures.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Broadly speaking, a method is described in which a decorative panel is produced by printing a pattern on a clear or transparent polymer layer, which is layered on top of a mold. The method of digitally printing a pattern onto a panel, provides unequaled performance and visual results compared to conventional methods. The described method allows for improved textured finish and slight 3D forms, more accurate ink placement over textures and forms and resistant protective coating not compromising textures capabilities.

The methods previously known in the art typically involve adding a clear coat on top of a laminate comprising a back, support surface on which is printed a pattern. Because such clear coating is generally liquid when it is applied, it naturally tends to self-level over the surfaces on which it is applied and fill any surface irregularities. Therefore, obtaining natural textures such as wood grain or tile porosities tends to be difficult, which often leads to unsatisfactory texture or visual appearance.

With the present method, the layer of clear or transparent polymer is formed on the mold and the additional panel layers are subsequently built on the clear coat. Because the clear coat is in direct contact with the mold, it exactly reproduces the texture of the mold, therefore avoiding the drawbacks generally associated with the self-leveling properties of the clear coat. The present method thus provides more natural visual characteristics and textures.

Figure 1:
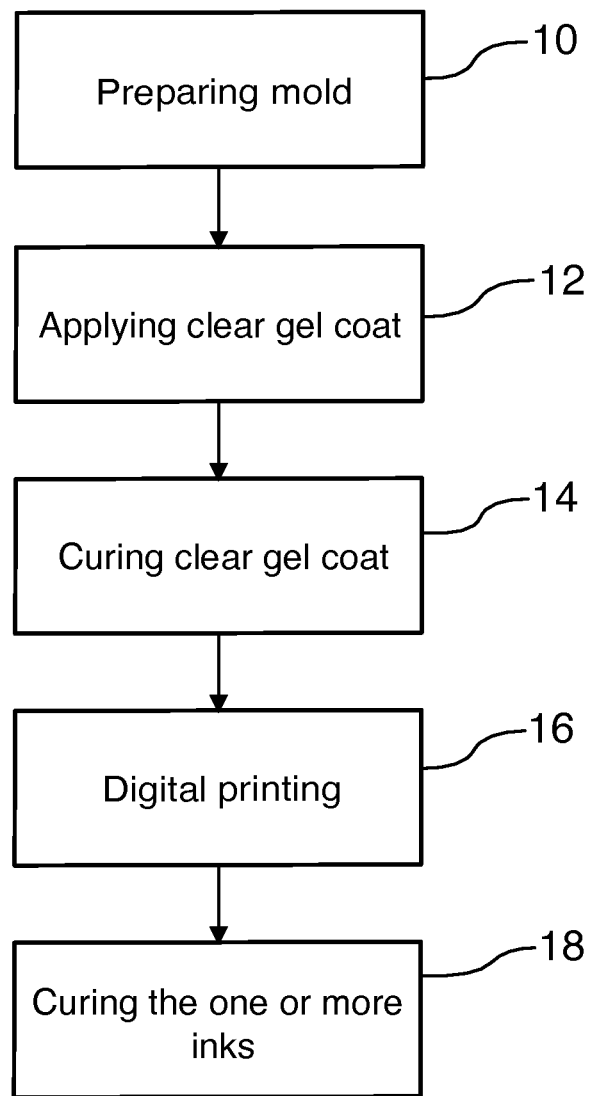
FIG. 1 is a flow diagram of a method of producing a pattern for a decorative panel, in accordance with one example.

The method will be described with references to FIGS. 1 and 2.

1. Pre-Treatment

According to step 10, the method begins by preparing the mold and then forming the clear layer on the mold before printing the pattern, in accordance with step 12. The clear layer is formed on the mold by spraying a clear polymer gel coat over substantially the entire surface of the mold. Alternatively, the clear gel coat could be applied with an application tool such as a roller or could be poured into the mold such that the clear gel coat flows and spreads out over the mold to form the clear layer.

The mold could be textured and have a decorative pattern thereon. In one example, the mold is embossed and includes at least one relief element which defines at least one corresponding relief element on the clear layer when the clear layer is applied on the mold. The corresponding relief element is a negative image of one relief element. For example, if the relief element of the mold is a ridge, the corresponding relief element created on the clear layer is a recess which is shaped and sized correspondingly to the ridge. In one example, the pattern imitates the appearance of a manmade design, such as a tiled surface reproducing the appearance of a tiled shower wall for instance. Alternatively, the pattern may imitate the appearance of brickwork or of a stone wall surface.

In one example, the corresponding relief element is shaped and sized to correspond to the pattern to be printed on the clear layer. For instance, the pattern may correspond to grout lines. In this case, the at least one corresponding relief element may be a recess which is shaped to provide the appearance of a grout line which would be formed between adjacent tiles of a tiled wall.

Alternatively, the mold could define a planar surface of a predetermined size and shape to create a planar panel of similar size and shape. The planar surface could be substantially smooth to produce a substantially smooth clear layer having a glossy appearance, or fine-textured so as to give a matte appearance to the clear polymer layer. The pattern could imitate the appearance of a natural surface, such as marble, granite or wood.

In one example, the mold is formed using a base model, which includes a panel base and a plurality of tiles or other elements of a manmade design (e.g. bricks or stones) which are secured on the panel base. The panel base may be made of wood or any other material that a person skilled in the art would deem fit for this purpose. The base model is then molded to create a reference mold, which includes all the features of the mold. The reference mold is then used to mold a master model or master plug, which includes all the features of the base model. This will allow the master model to be used to make at least one mold. It will be appreciated that the master model can be used to make a plurality of molds to facilitate the manufacturing of decorative panels in a relatively large quantity.

In one example, the clear gel coat is added to a thickness of about 0.001 to 0.100 inches (0.0254 mm to 2.54 mm). In another example, the gel coat is added to a thickness of 0.005 to 0.03 inches (0.127 mm to 0.761 mm). In yet another example, the gel coat is added to a thickness of 0.01 to 0.02 inches (0.254 mm to 0.508 mm). In a preferred example, the gel coat is added to a thickness of about 0.014 inches (0.356 mm). Alternatively, the clear gel coat could be added to another thickness based on the desired physical properties of the gel coat and/or panel, including resistance to abrasion, thermal shocks, physical impacts and the like.

The term "clear gel coat" as used herein is intended to mean any coating or material that is at least partially transparent so as to enable visual perception of the ink and/or opaque gel coat applied to the clear coat, once the panel manufacture is complete and the panel is installed on a surface. The person skilled in the art will appreciate that the clear gel coat can therefore be completely transparent (i.e. the gel coat has no color) or be tinted or colored. In the latter case, the clear coat color will collaborate with the color of the ink and the color of the opaque coat applied subsequently to provide the panel with its final color. The term " clear gel coat" as intended herein therefore includes materials such as acrylic resins, vinyl ester resins, polyurethane resins, polyester resins and the like.

The person skilled in the art will appreciate that the gel coat of the panel may have a glossy or mat finish once unmolded, depending on the nature or type of the clear coat used, as well as of the configuration of the mold.

Examples of clear gel coats suitable for the purpose of manufacturing a panel according to the current method include gel coats such as those commercialized by CCP Composites Canada (Brampton, Ontario, Canada), AOC® (Collierville, Tenn.), Ashland Inc. (Covington, Ky.) and Valspar (Minneapolis, Minn.). As it will be appreciated, other suitable clear gel coats could also be used.

In one example, a photoinitiator may be added to the gel coat to initiate the polymerization process. Examples of photoinitiator suitable for the purpose of manufacturing panels according to the present method includes Bis Acyl Phosphine Oxide (BAPO) type of photoinitiator like BASF's CIBA® photoinitiators of the Irgacure® series, as well as MEKP catalyst commercialized by Eager Polymers (Chicago, Ill.). It will however be understood that any photoinitiator capable of initiating, speeding or otherwise facilitating UV curing of the clear gel coat could be used, as well as a co-initiated mixture of previous initiators.

In one example, the photoinitiator can be used in a concentration ranging from 0.05% to 2.0% (w/w). As it will be appreciated by the person skilled in the art, the concentration of photoinitiator used in combination with the clear coat resin will vary according to the clear coat type and composition, the type of photoinitiator, the desired UV curing properties (e.g. curing time, moisture content, clear coat firmness). As such, the photoinitiator concentration will be adjusted or optimized according to such parameters, using methods known by those skilled in the art.

2. First Curing

According to step 14, the clear layer is cured by exposing the substrate to ultraviolet light or some conventional means of curing known to those skilled in the art, such as exposing the clear layer to heat or to an electron beam.

In one example, the clear layer is cured using a UV light exposition varying from 180 to 2000 mill joules per square centimeter ($mJ/cm^2$). The person skilled in the art will however appreciate that depending on the desired cure time, the type and concentration of photoinitiator (if any), the type of clear coat and the desired properties of the gel coat, other UV light expositions could be used.

Examples of suitable UV curing lamps suitable for the purpose of carrying out the present method include UV curing flood lamps, UV conveyors and UV lamps mounted to CNC apparatuses. As it will be appreciated by a person skilled in the art, the UV light exposition ($mJ/cm^2$) will vary based on the distance between the UV lamp and the surface to be cured, the intensity of the UV lamp in watt per inch (wpi) and the exposure time, which itself can vary depending on the displacement speed of the UV curing lamp relative to the surface to be cured.

In one example, the clear layer is cured for about 10 minutes to about 3 days, and preferably between 30 minutes and 1 day, and more preferably between 30 and 75 minutes.

As it will be appreciated by the person skilled in the art, the curing time for the first curing will vary according to the clear coat type and composition, the type of photoinitiator, the desired UV curing properties (e.g. curing time, moisture content, clear coat firmness), as well as the characteristics of the UV lamp system used. This person skilled in the art will also appreciate that such parameters can be adjusted according to known methods.

3. Digital Printing

According to step 16, a decorative pattern is produced on the cured clear layer by digitally printing one or more inks onto the cured clear layer. In one example, the digitally decorative pattern matches the pattern on the mold (e.g. grout lines).

The digital printing of the decorative pattern on the cured clear layer may take place sometime after curing thereof, to ensure that the physical and chemical properties of the clear layer are adequate to receive the ink. In one example, the digital printing of the decorative layer takes place between 5 minutes and 10 days after curing of the clear layer. In another example, the digital printing of the decorative layer takes place between 10 minutes and 8 days after curing of the clear layer. In yet another example, the digital printing of the decorative layer takes place between 10 minutes and one day after curing of the clear layer. In a preferred example, the digital printing of the decorative layer takes place between 10 minutes and 120 minutes after curing of the clear layer.

The digital printing of the decorative pattern includes inkjet printing, which may be performed using an inkjet printer. Typically, the inkjet printer comprises a printing head which is adapted to propel droplets of ink on the clear layer. Specifically, the printing head comprises a plurality of nozzles which are adapted to be oriented so as to propel ink towards the clear layer. Alternatively, the inkjet printer may include a plurality of printing heads instead of a single printing head. Examples of inkjet printers suitable for carrying out the method include Acuity HF™ wide format printer (Fujifilm, Tokyo, Japan), Agfa Graphics™ wide format high-speed curable inkjet systems (Agfa Graphics, Mississauga, Ontario, Canada), HP Scitex™ printers (Hewlett-Packard Company, Palo Alto, Calif.), Xerox® wide format printers (Xerox, Norwalk, Conn.) and Canon® Océ Arizona™ printers (Canon, Mississauga, Ontario, Canada). The person skilled in the art will appreciate that many wide format inkjet printers and CMYK presses exist and that any such suitable printers or CMYK presses could be used without departing from the purpose of the current method.

The printing includes positioning the printing head at a printing distance from the at least one relief element. The printing distance is selected to allow the pattern to have a desired resolution so as to provide a desired appearance to a user, such as a tiled appearance. As it will be appreciated, the printing distance between a portion of a panel (e.g. a first relief element) can be different than the printing distance between another portion of the same panel (e.g. a second relief element). In one example, the printing distance between the printing head and a portion of the clear surface is less than 8 mm. In a further example, the printing distance between the printing head and the portion of the clear surface is between 0.1 mm and 5 mm. In a preferred example, the printing distance between the printing head and the portion of the clear surface is between 1.5 and 4.0 mm. It has been found that at this printing distance, the printing would produce a relatively sharp pattern.

In one example, the ink used to carry out the method is a UV curable ink. Exemplar of suitable ink includes Fujifilm Uvijet KO and KI series UV curable inks (Fujifilm, Tokyo, Japan), Anapurna™, Anuvia™ and Agora™ UV curable inks (Agfa Graphics, Mississauga, Ontario, Canada), HP 250 Scitex™ Ink (Hewlett-Packard Company, Palo Alto, Calif.), Wide Format IJP 2000™ Ink (Xerox, Norwalk, Conn.) or any ink suitable for use with specific wide format printers, according to the technical specifications of such printers.

As it will be appreciated, the coverage density of the ink over the clear layer (i.e. the proportion or percentage of clear layer covered by the digitally printed ink) will vary depending on the printed pattern. In one example, the ink coverage density varies between 0% and 100%. It will also be appreciated that multiple layers of ink can be applied on the clear layer, and that such multiple layers of ink may overlap each other partially and or totally, depending on the desired color intensity.

For instance, on a CMYK press, using cyan and magenta inks at both 100% would result in a 200% coverage with a vibrant red color. In another example, rich black would be produced by combining 75% cyan, 68% magenta, 67% yellow and 90% key (black), which would result in a 300% coverage. In such a case, the ink coverage would thus exceed 100% the clear surface. By way of an example, an ink coverage density of 200% would indicate that the clear layer is covered by two layers of ink, each ink layer covering the entire surface of the clear layer, and an ink coverage density of 150% would indicate that a first ink layer covers the entirety of the clear layer while a second ink layer would be applied on 50% of the clear layer. Alternatively, a 150% ink coverage density could indicate that two ink layers each cover 75% of the clear surface. Therefore, in one example, the ink coverage density could vary between 0% and 400% of the clear layer. In another example, the ink coverage density could vary between 0% and 280%.

In one example, the size of the printing head is smaller than the clear layer surface. Specifically, digitally printing the clear layer requires the print head to be displaced along a printing plane coplanar with the clear layer. The printing plane could be located above the clear layer and the printing head could be configured to propel ink generally downwardly towards the clear layer. To apply ink over a desired portion of the clear layer to form the pattern, the print head is displaced along a predetermined printing path defined in the printing plane. The printing plane is at the printing distance from the clear polymer layer, such that the printing head may remain at the predetermined printing distance throughout the whole printing operation. This allows the printing head to apply the ink to form a pattern which has a relatively uniform resolution.

In one example, the predetermined printing path is serpentine. Specifically, the area of the printing plane above the clear layer is divided into a plurality of adjacent strips of similar width, which correspond to a width covered by the printing head. The printing head is first displaced linearly along a first strip in a first direction. While being displaced along this first strip, the printing head prints a first portion of the pattern corresponding to the first strip. When the printing head arrives to the end of the first strip, the printing head is displaced transversely until it is aligned with a second strip, adjacent the first strip. The printing head is then displaced along the second strip in a second direction opposite the first direction. While being displaced along this second strip, the printing head prints a second portion of the pattern corresponding to the second strip. This is repeated until the entire surface of the clear layer is covered and the entire pattern is printed. This allows the entire surface of the clear layer to be covered relatively efficiently.

Figure 3A:
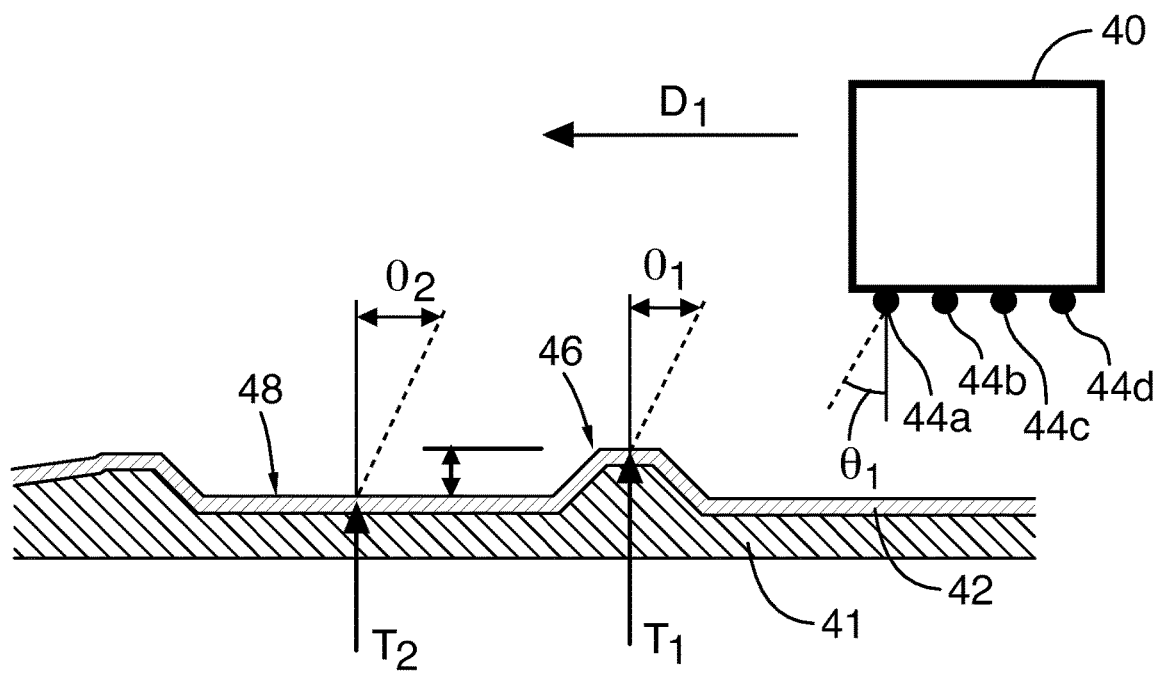
FIG. 3A is a schematic side view of a printing head propelling ink on a clear layer in accordance with the method shown in FIG. 1, in which the printing is unidirectional.

In another example, the printing head is configured for unidirectional printing (see for instance, FIG. 3A. Specifically, the printing head only prints on the clear layer when it is displaced in the first direction. In this example, the printing head is first moved along the first strip in the first direction from a first side to an opposite side of the clear layer while printing on the clear layer. The printing head is then moved back along the first strip to the first side without printing on the clear layer. The printing head is then moved transversely until it is aligned with the second strip. The printing head is then displaced towards the opposite side of the clear layer along the second strip while printing on the clear layer. This process is repeated until the entire pattern is printed on the clear layer.

Alternatively, the printing head could be displaced along the first strip to the opposite side of the clear layer while printing, moved transversely until it is aligned with the second strip, and then moved along the second strip towards the first side of the clear layer without printing on the clear layer. The printing head could then be moved back towards the opposite side while printing on the clear layer. This process could be repeated until the entire pattern is printed on the clear layer. It will be appreciated that various other printing sequences are also possible.

In an alternative example, the printing head could be stationary and the mold could be moved relative to the printing head, or the mold and the printing head could both be moved relative to each other.

In one example, the printing head is displaced further than the end of the strip along which it is travelling. Specifically, the predetermined path of the printing head includes a first portion which is located above the clear layer and a second portion, corresponding to transverse movement of the printing head from one strip to an adjacent strip, which is laterally offset relative to the clear layer. This allows the printing head to travel all the way to the edges of the panel, in order to print portions of the pattern which are located at or near the edges of the panel.

Alternatively, the printing head could be large enough to print the pattern on the entire desired portion of the clear polymer layer, without having to displace the printing head. In one example, the inkjet printer could include a plurality of printing heads arranged so as to cover the entire clear layer in a single pass.

In one example, the printing further includes printing only on the at least one relief element. For example, if the relief element is a ridge as explained above, ink will only be applied on a top surface of the ridge.

Alternatively, the printing of the clear layer further includes printing a first pattern portion on the at least one relief element and a second pattern portion on an area of the clear layer adjacent the at least one relief element. For example, ink could be applied directly on a flat portion of the clear layer to form a streaked pattern having the appearance of a marbled surface, as well as on the top surface of the ridges which would define a tiled pattern on the decorative panel. The resulting panel would therefore have the appearance of a marble tiled surface.

In one example, the inkjet printer is pre-programmed to apply the inks to match the first pattern on the panel substrate. In one example, the digital printer comprises a controller. A digital image of the pattern is inputted into the controller, which controls the digital printer accordingly to produce the printed pattern on the cured clear layer. The digital image could be in any digital format known to the skilled addressee.

FIG. 3A shows a printing head 40 propelling ink on a clear layer 42 cured on a mold 41, in accordance with one example. In this example, during printing, ink is propelled forward of the printing head 40 and obliquely relative to the clear layer 42 to account for the displacement $D_1$ of the printing head 40. Specifically, the printing head 40 is set such that ink is propelled from one of the nozzles 44a-44d at a predetermined angle $\theta_1$ to a first target point $T_1$ on the clear layer 42 which is forward of the nozzle (e.g. forward of nozzle 44a) relative to a displacement direction of the printing head 40. The predetermined angle $\theta_1$ could be selected according to a displacement speed of the printing head, for instance.

To print on the first target point $T_1$ located on a top surface of a ridge 46, the ink is propelled from the nozzle (e.g. nozzle 44a) forwardly at a first horizontal offset distance $O_1$ from the position of the nozzle. To print on a second target $T_2$ which is located on a plane 48 below the plane defined by the top surface of the ridge 46, the ink is propelled from the nozzle (e.g. nozzle 44a) forwardly at a second horizontal offset distance $O_2$. Since the predetermined angle $\theta_1$ at which the ink is propelled forwardly remains constant, the second offset distance $O_2$ is greater than the first offset distance $O_1$, as shown in FIG. 3A. Therefore, in this example, the digital image inputted into the controller can be distorted or warped according to a tridimensional profile of the clear layer, which corresponds to the tridimensional profile of the mold. The distortion or warping can depend on different factors, such as the height, shape and position of the ridges, or of any other tridimensional element of the clear layer. The distortion or warping can also depend on the printing distance and on the displacement speed of the printing head.

Figure 3B:
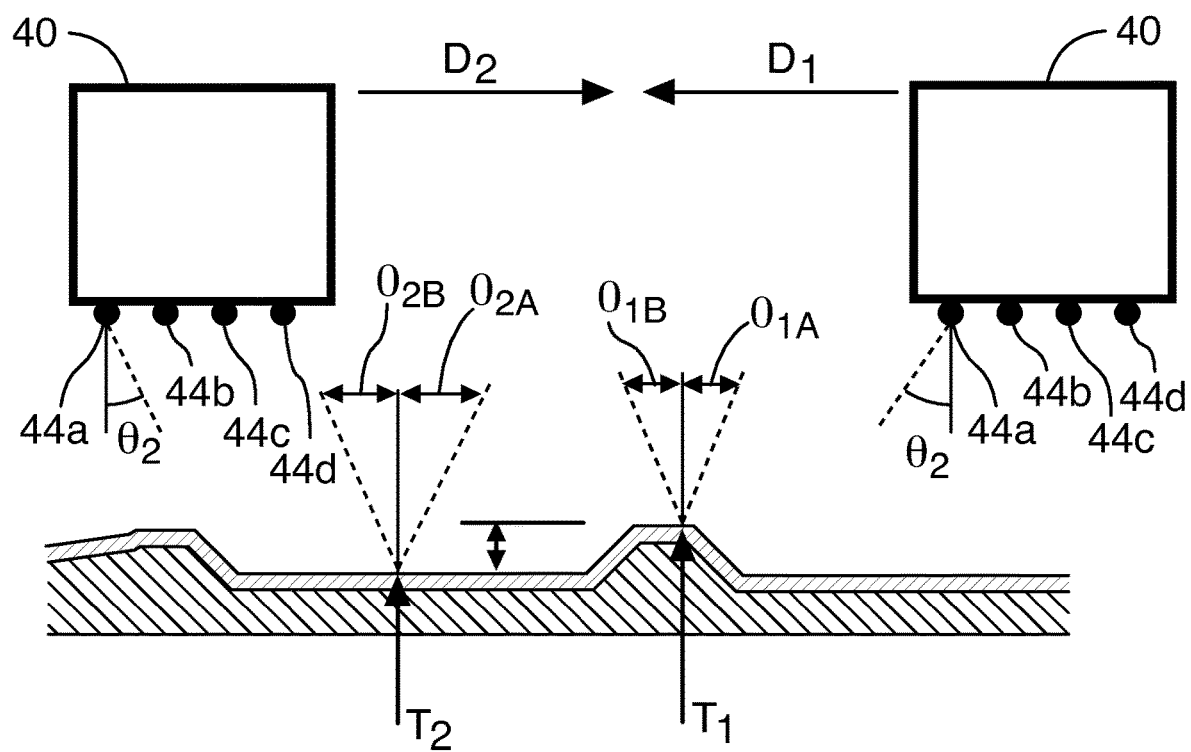
FIG. 3B is a schematic side view of a printing head propelling ink on a clear layer in accordance with the method shown in FIG. 1, in which the printing is bidirectional.

Alternatively, the printing head 40 may be configured for bidirectional printing, as seen in FIG. 3B. In this example, the printing head 40 may propel ink at a first predetermined angle $\theta_1$ when displaced in the first direction $D_1$ and may propel ink at a second predetermined angle $\theta_2$ when displaced in the second direction $D_2$ opposite the first direction $D_1$. As shown in FIG. 3B, the second predetermined angle $\theta_2$ is similar to the first predetermined angle $\theta_1$, but is defined in the opposite direction, such that the second predetermined angle $\theta_2$ is substantially a mirror image of the first predetermined angle $\theta_1$. In this example, the digital image is distorted according to this configuration.

In another example, the printing head 40 could instead be mounted on a multiaxis machine to control the position and orientation of the printing head 40 relative to the clear layer. In this configuration, the pattern could be printed on the clear layer directly based on the digital image without requiring a distorted image.

Figure 4:
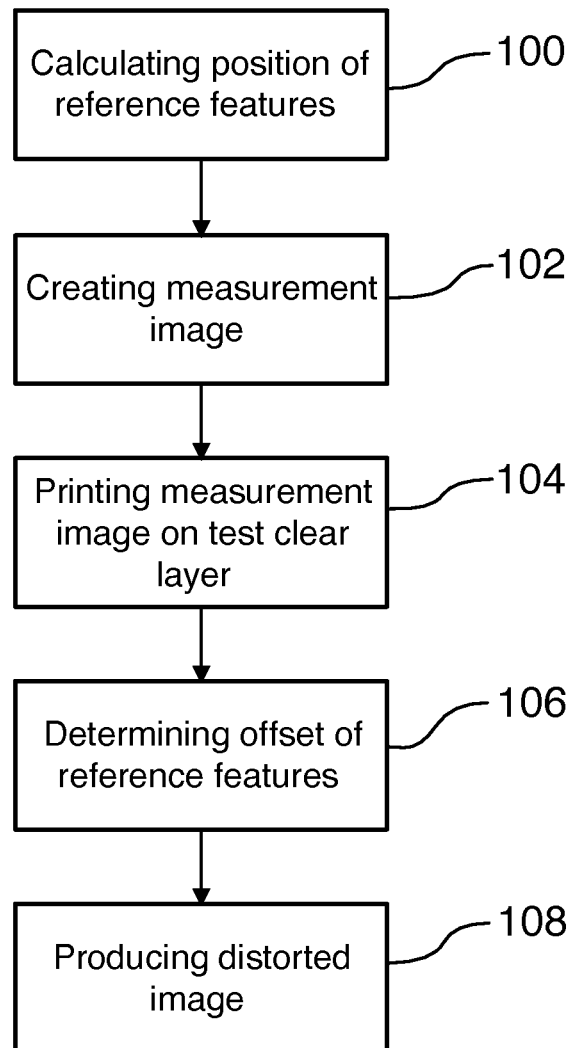
FIG. 4 is a flow diagram of a method for producing a distorted image to produce the pattern on the clear layer in accordance with the method shown in FIG. 1.

Referring now to FIG. 4, a method for producing a distorted image which will produce the pattern once inputted in the controller and printed on the clear layer will be described.

Figure 5:
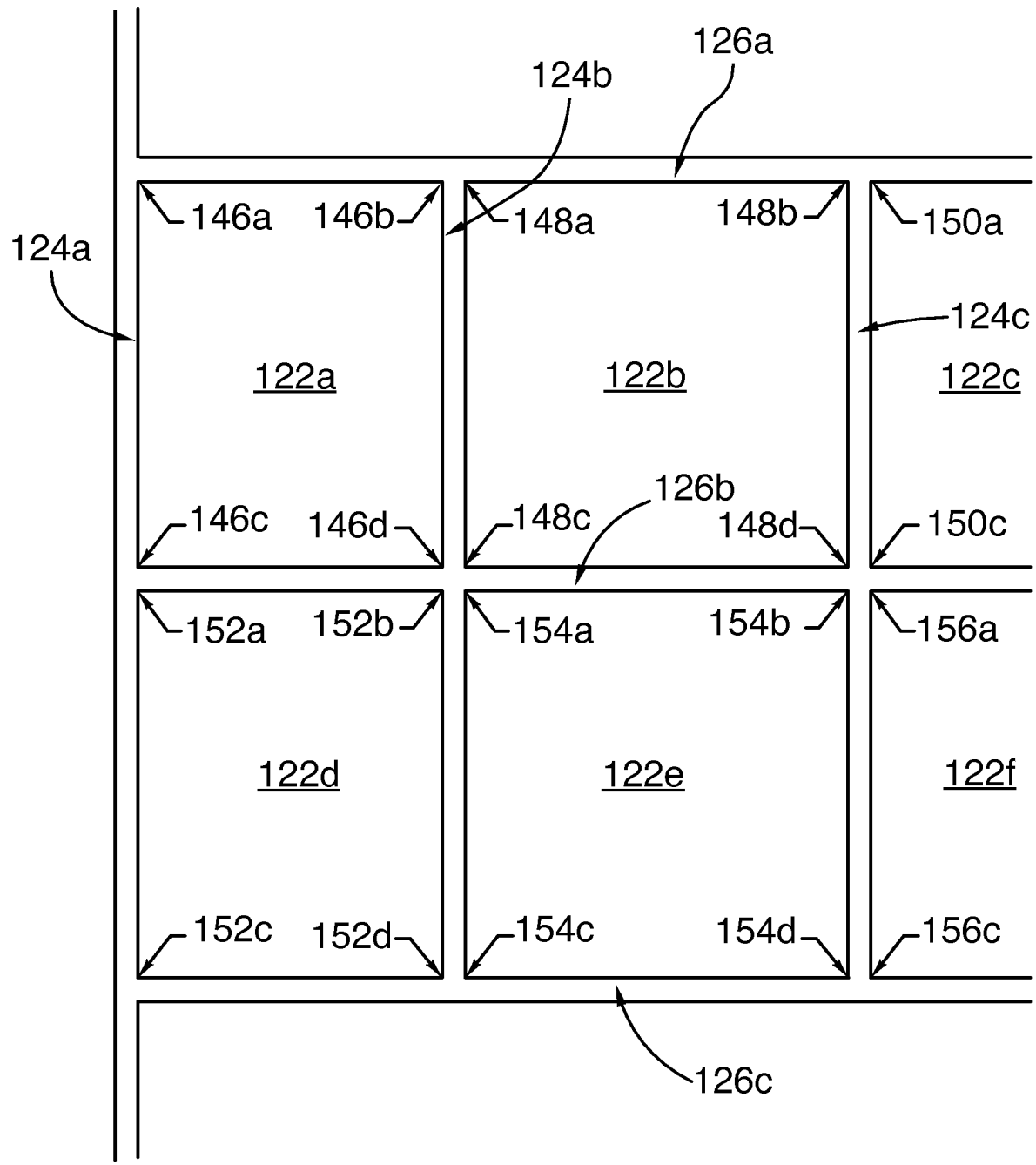
FIG. 5 is a drawing of a digital image in which a position of one or more reference features of the pattern is calculated, in accordance with the method shown in FIG. 4.

In this example, the digital image representing the pattern to be printed is first provided. According to step 100, a position of one or more reference features of the pattern is then calculated. In the example illustrated in FIG. 5, the pattern 120 includes a tiled pattern including a plurality of tile elements 122a-122f separated by vertical grout line elements 124a-124c and horizontal grout line elements 126a-126c. In this example, the reference features include the four corners (e.g. corners 146a-146d) of each tile element 122a-122f. This position may include Cartesian coordinates of the one or more features relative to one or more reference locations. Alternatively, other means of defining a position may be used.

Figure 6A:
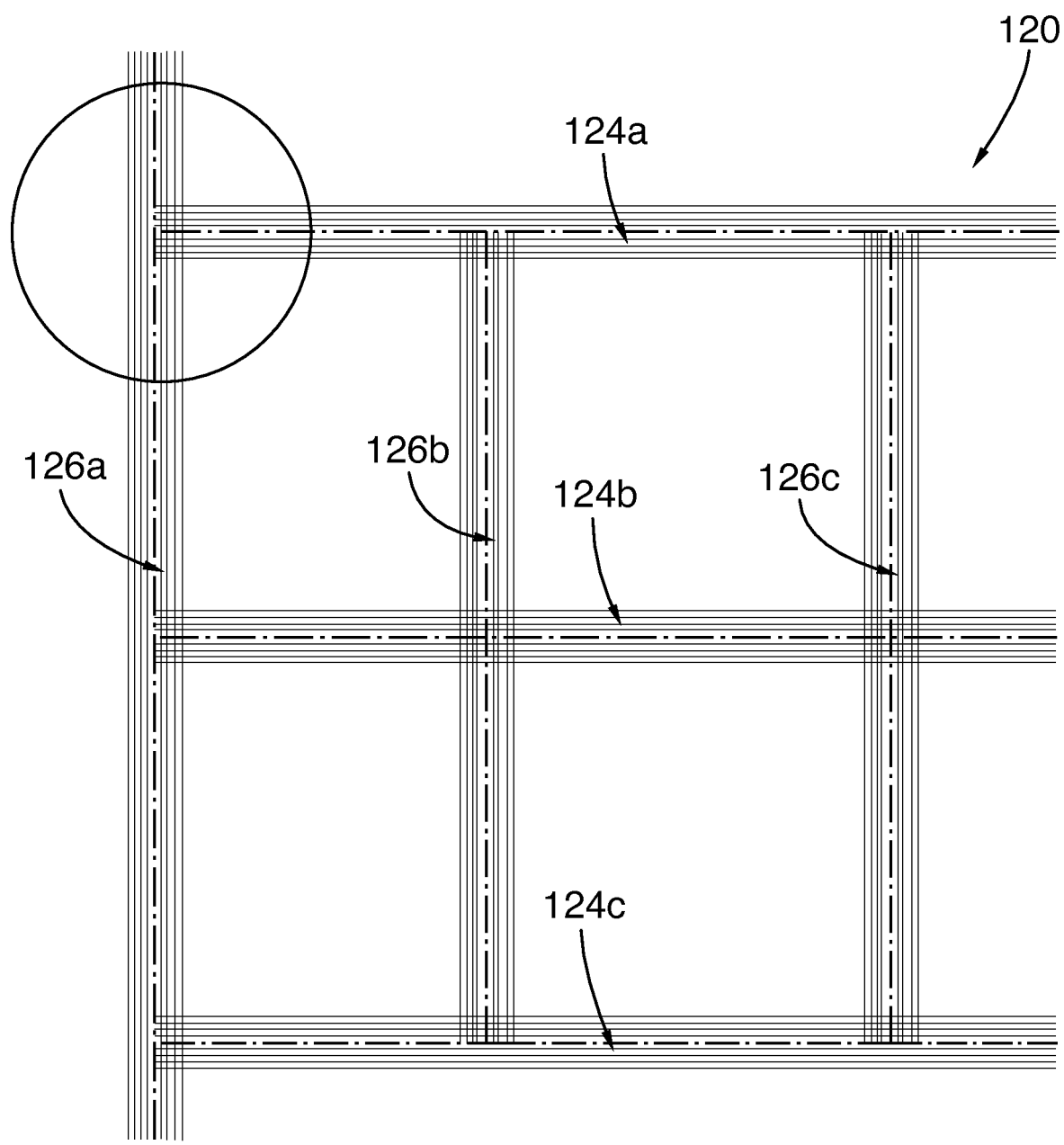
FIG. 6A is a drawing of a measurement image created from the digital image shown in FIG. 5.
Figure 6B:
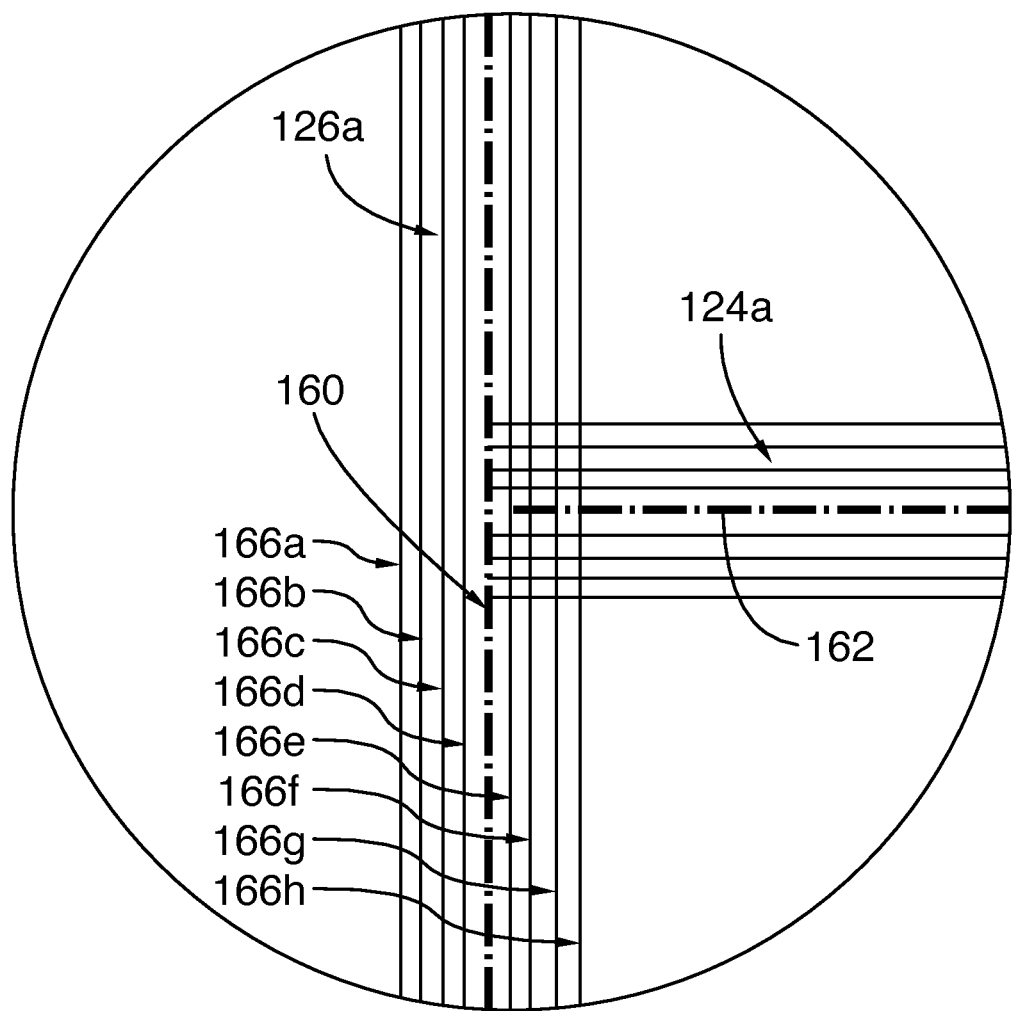
FIG. 6 B is an enlarged view of a portion of FIG. 6A.

According to step 102, a measurement image is then created. The measurement image includes the pattern from the digital image and a plurality of reference markers disposed at a predetermined location relative to the reference features of the pattern. In the example illustrated in FIGS. 6A and 6B, each grout line element 124a-124c and 126a-126c includes a centerline (e.g. centerlines 160 or 162) which is marked on the measurement image, and the reference markers include a plurality of spaced-apart reference lines offset from this centerline (e.g. offset lines 166a-166h).

Figure 7:
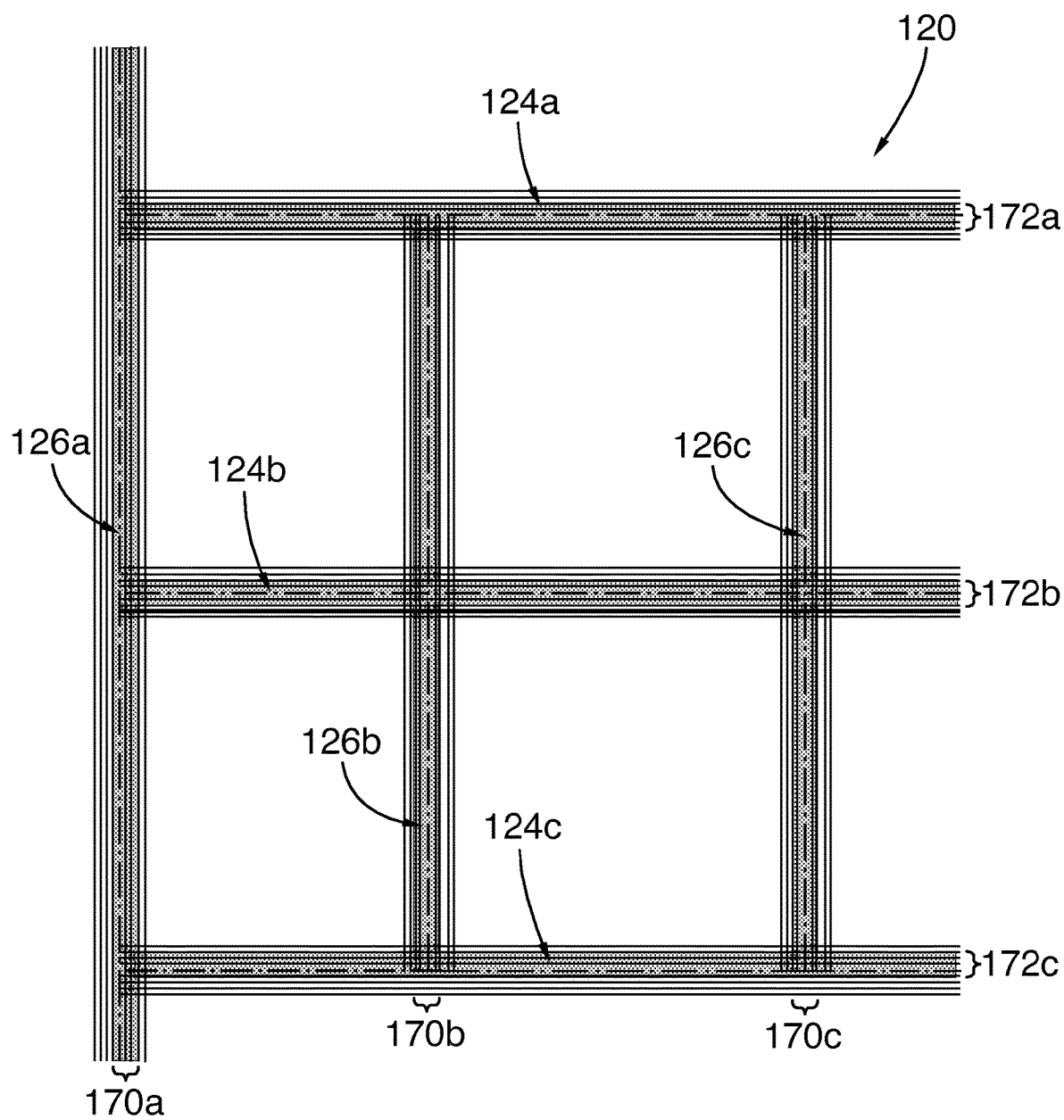
FIG. 7 is a drawing of the measurement image of FIGS. 6A and 6B printed on a test clear layer.

According to step 104, the measurement image is then printed on a test clear layer, as shown by the shadowed areas 170a-170c and 172a-172c in the grout line elements 124a-124c and 126a-126c, best shown in FIG. 7. The test clear layer will not be used to manufacture a decorative panel, but is merely used to produce the distorted image. As explained above, the clear layer includes a plurality of ridges formed by corresponding ridges defined on the mold. In this example, the grout lines of the pattern are designed to be printed on the top surface of the ridges. Alternatively, the measurement image could be printed directly on the mold.

Figure 8:
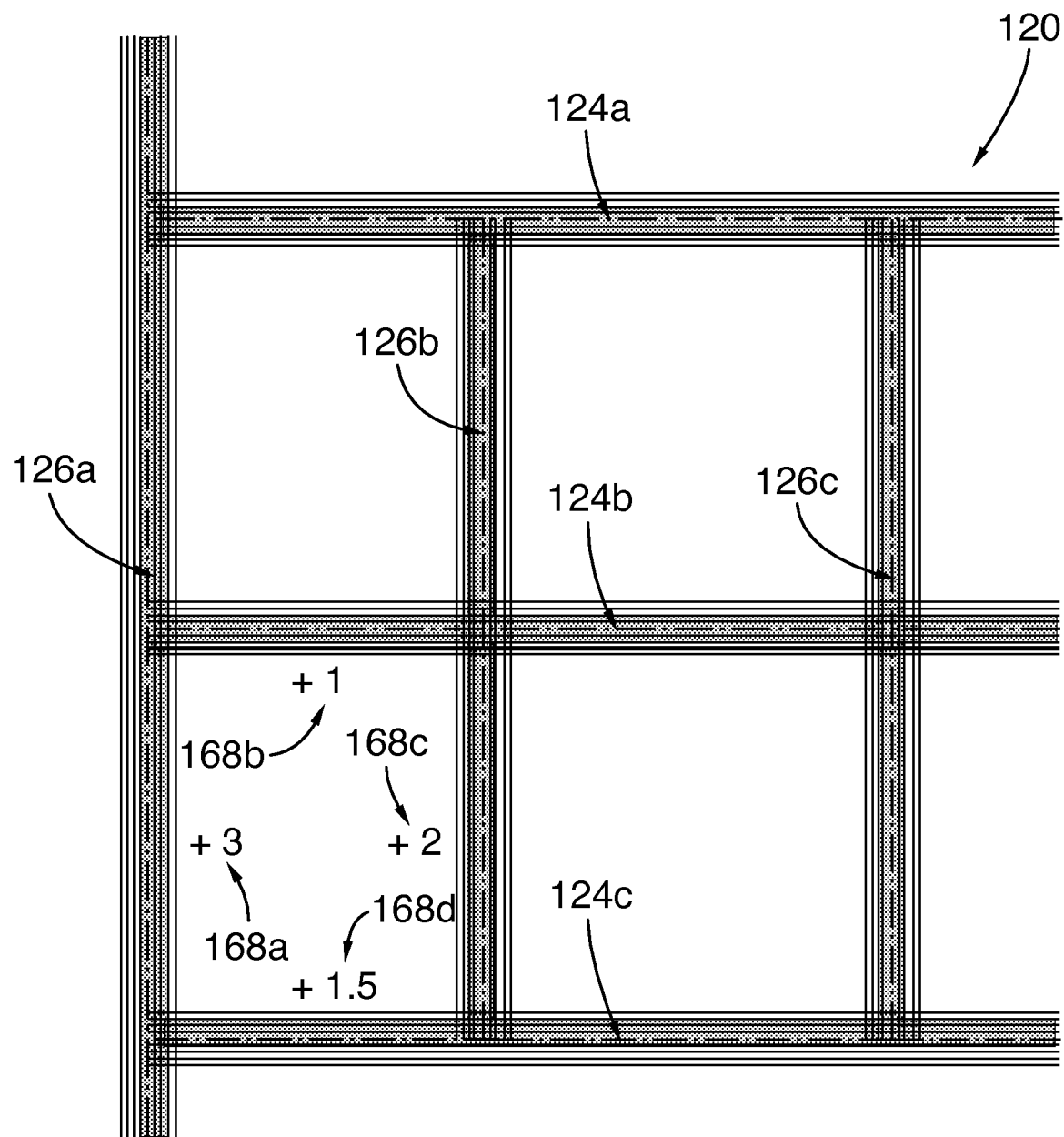
FIG. 8 is a drawing of the measurement image of FIGS. 6A and 6B printed on the test clear layer, in which a required offset of reference features of the digital image have been determined.

According to step 106, the test clear layer with the printed measurement image is then used to determine a required offset of the reference features in order for those features to be aligned with the ridges when printed on the clear layer, as shown in FIG. 8. In the illustrated example, an operator can determine a position of the boundaries of the grout lines relative to the centerline of the grout line by visually assessing on which reference line each boundary lines up. Since the distance between the reference lines is known, this allows the operator to modify the digital image by applying a correction factor (e.g. correction factors 168a-168d in FIG. 8) and to produce the distorted image, according to step 108.

This method therefore provides relatively simple means for an operator to produce the distorted image based on the digital image representing the pattern to be printed. This allows the pattern to be printed on the top surfaces of the ridges, for instance. In one example, a first portion of the pattern is printed on the ridge and a second portion of the pattern is printed on a flat portion of the clear layer adjacent the ridge, which serves as the reference feature.

Alternatively, other means of producing a distorted image which, when printed on the clear layer, produces a desired pattern can be used.

For example, a sensor could be used to map a tridimensional profile of the clear layer, and the distorted image could be produced based on this mapped profile. The pattern could also include a plurality of color patterns which, when printed on the clear layer, overlap each other at least partially to form the pattern. Each color pattern could be printed separately and be produced using a corresponding distorted image.

4. Second Curing

Referring back to FIG. 1, the one or more inks digitally printed on the clear layer is then cured. In this step, the inks are exposed to ultraviolet radiation for sufficient time to cure them. In one example, the digitally printed clear layer is exposed to UV light 100 mJ/cm$^2$ to 2000 mJ/cm$^2$. The person skilled in the art will appreciate that exposing the digitally printed clear layer to UV light may not be required. In such a case, the ink on the surface of the digitally printed clear layer could be allowed to dry at a defined temperature for a determined amount of time, prior to the subsequent application of the opaque gel coat. In one example, the ink is allowed to dry for a period of 1 minute to 10 days. In another example, the ink is allowed to dry for a period ranging from 5 minutes to 8 days. In yet another example, the ink is allowed to dry for a period ranging from 5 minutes to 120 minutes.

In one example, the ultraviolet radiation is emitted by a UV light source, which is located next to the printing head containing the nozzle. In one example, the UV exposure of the ink to be cured is modulated by adjusting the travel time of the ink layer relative to UV light source, similarly to the UV cure of the clear layer. In another example, the UV exposure of the ink to be cured is modulated by adjusting the intensity of the UV light source rather than the exposition time.

5. Second Gel Coat Application

Figure 2:
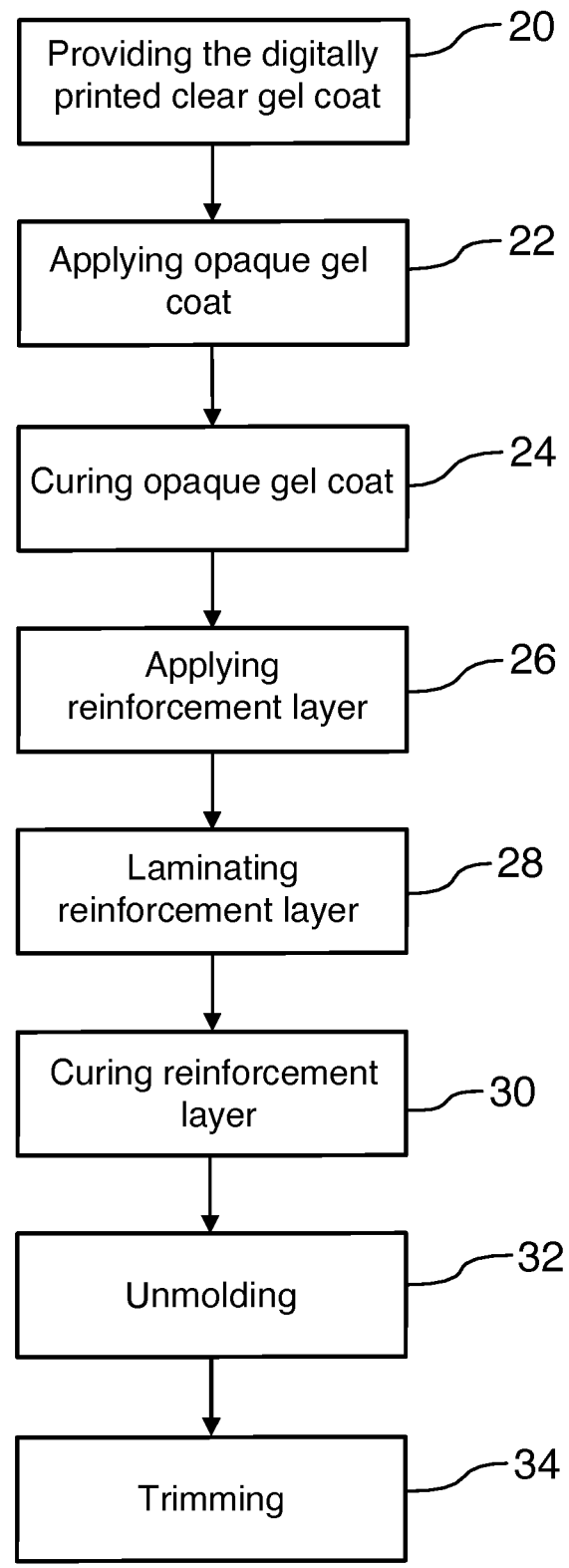
FIG. 2 is a flow diagram of a method of manufacturing a decorative panel having a digitally printed pattern thereon, in accordance with one example.

Referring now to FIG. 2, once the printed clear layer is cured it is then treated with an opaque gel coat which forms an opaque layer, according to step 22. This is achieved by spraying an opaque gel coat over substantially the entire surface of the printed and cured clear layer. The ink digitally printed on the clear layer is now sandwiched between the clear and opaque layers.

The term "opaque gel coat" as used herein is intended to mean any coating or material that is at least partially opaque so as to provide a visual barrier behind the clear coat layer and the digitally printed ink, once the panel manufacture is complete and the panel is installed on a surface. The person skilled in the art will appreciate that the opaque gel coat can therefore be completely opaque or be partially opaque. In one example, the opaque gel coat has a white color. In another example, the opaque gel coat has another color. In yet another example, the opaque gel coat color will collaborate with the color of the ink and the color of the clear coat applied previously to provide the panel with its final color. The term "opaque gel coat" as intended herein therefore includes materials such as acrylic resins, vinyl ester resins, polyurethane resins, polyester resins and the like. Non-limitative examples of suitable opaque gel coats include opaque gel coats commercialized by CCP Composites Canada (Brampton, Ontario, Canada), AOC® (Collierville, Tenn.), Ashland Inc. (Covington, Ky.) and Valspar (Minneapolis, Minn.).

In one example, the opaque gel coat is added such that the second layer made of opaque gel coat has a thickness ranging from 0 to 0.05 inches (0 mm to 1.27 mm). In another example, the layer of opaque gel coat has a thickness ranging from 0.005 to 0.03 inches (0.127 mm to 0.761 mm). In yet another example, the second layer has a thickness ranging from 0.01 to 0.02 inches (0.254 mm to 0.508 mm). In a preferred example, the second layer has a thickness of about 0.015 inches (0.381 mm).

The opaque gel coat may be colored in any color, specifically in a color which would contrast with the pattern. Alternatively, instead of opaque gel coat, a clear gel coat may be sprayed on the clear layer to form another clear layer.

6. Third Curing

According to step 24, the opaque layer is then cured. The opaque gel coat may be cured using a catalyst, such as a peroxide-based catalyst, which is mixed in the opaque gel coat so as to activate the curing. An example of a suitable catalyst is Luperox® DDM-9 catalyst commercialized by Arkema Inc. (Philadelphia, Pa.), but any other suitable catalyst could be used for the purpose of the present method. In one example, the concentration of catalyst varies between 1.5% and 1.8% (w/w). In one example, the opaque layer is cured for about 30 to 50 minutes. In a preferred example, the opaque layer is cured for about 40 minutes. Alternatively, the opaque layer may include a photoinitiator and be cured by exposition to ultraviolet light. In one example, the opaque layer is cured using a UV light exposition varying from 180 to 4000 mJ/cm$^2$. For a complete cure, the opaque layer may be exposed to ultraviolet light using a UV light exposition varying from about 2000 to 4000 mJ/cm$^2$.

7. Reinforcement and Further Processing

After applying the opaque layer, a reinforcement layer is applied over the opaque layer, in accordance with step 26. In one example, the reinforcement layer includes resin and glass fibers.

According to step 28, the reinforcement layer is then laminated.

According to step 30, the reinforcement layer is then cured using conventional means. The reinforcement layer may also include a catalyst for promoting the curing of the reinforcement layer. In one example, the reinforcement layer is cured for about 60 minutes. At this step, the decorative panel is substantially formed in the mold.

According to step 32, the decorative panel is then removed from the mold or unmolded.

According to step 34, the decorative panel may then be trimmed to remove excess material from the decorative panel.

The decorative panel may then be further processed and/or treated. For instance, the decorative panel may be inspected, undergo quality testing/inspection, be assembled in a kit including a plurality of decorative panels, be packaged and/or stored.

After the decorative panel is removed from the mold, the mold could be re-used to produce another decorative panel, or a plurality of similar decorative panels. In one example, a plurality of different molds could be manufactured, and each mold could be designed to produce a corresponding decorative panel. Each mold could have an identifier, such as a barcode or an RFID tag, and a sensor could be used to identify the mold based on this identifier. The inkjet printer could then select and print a pattern associated with the decorative panel corresponding to the mold identified.

It will be appreciated that all steps of the method may be performed at the same location. Alternatively, some steps of the method could be performed at one location while other steps of the method may be performed at another location.

Figure 9:
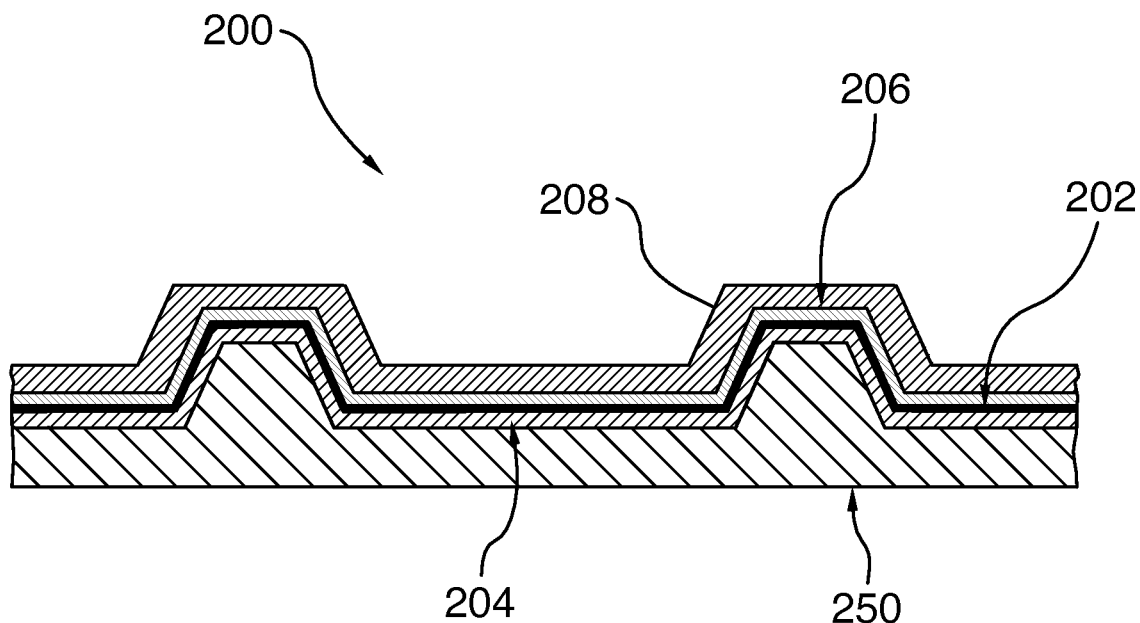
FIG. 9 is a cross-section view of a decorative panel having a digitally printed pattern, in accordance with one example.

FIG. 9 shows a cross-section of a finished decorative panel 200 on a mold 250, in accordance with one embodiment. A pattern 202 is digitally printed on a clear layer 204 and an opaque layer 206 covers substantially the entire surface of the clear layer 204, such that the pattern 202 is sandwiched between the clear and opaque layers 204, 206. When the decorative panel 200 is removed from the mold 250, the clear layer 204 defines a front of the decorative panel 200 and provides an interface between the panel and the environment. Since the clear layer 204 is clear or transparent, the pattern 202 is visible through the clear layer 204. On the illustrated example, the decorative panel 200 further includes a reinforcement layer 208 which substantially covers the entire surface of the opaque layer 206.

Figure 10:
FIG. 10 is a photograph of a decorative panel, in accordance with one example, which includes a tiled surface in which each tile includes a different pattern to show examples of various digitally printed patterns.

FIG. 10 shows an example of a decorative panel, which includes a tiled surface in which each tile includes a different pattern, to showcase examples of patterns which could be printed using the method described above. It will be appreciated that all the illustrated patterns could be printed in a single printing operation using this method. Various other patterns could be produced using the method described above.

Although the above description relates to a specific preferred embodiment as presently contemplated by the inventor, it will be understood that the invention in its broad aspect includes mechanical and functional equivalents of the elements described herein.

What is claimed is:

1. A decorative panel for installation on a surface, comprising:
   a first layer including a front face and a back face, the first layer defining a front of the decorative panel, the first layer being formed by applying a clear polymer gel coat on a mold having at least one relief element, wherein the front face of the first layer includes at least one corresponding relief element to the at least one relief element;
   a second layer having a front surface and a back surface, the front surface of the second layer covering substantially the entire back face of the first layer; and
   one or more patterns located between the back face of the first layer and the front surface of the second layer, the one or more patterns being digitally printed on the back face of the first layer and visible through the first layer, wherein the front face of the first layer faces away from the surface.

2. The decorative panel according to claim 1, wherein the second layer is opaque.

3. The decorative panel according to claim 1, further comprising a reinforcement layer covering substantially the entire back surface of the second layer.

4. The decorative panel according to claim 1, wherein the first and second layers define a textured surface.

5. The decorative panel according to claim 1, wherein an area of the first layer adjacent to the corresponding relief element defines a flat surface.

6. The decorative panel according to claim 1, wherein the one or more patterns imitate the appearance of a natural material.

7. The decorative panel according to claim 1, wherein the one or more patterns imitate the appearance of a manmade design.

8. The decorative panel according to claim 7, wherein the manmade design is selected from a group consisting of a tiled surface, brickwork, and a stone wall surface.

9. The decorative panel according to claim 1, wherein the one or more patterns comprise at least one layer of at least one ink.

10. The decorative panel according to claim 1, wherein the corresponding relief element is a negative image of the at least one relief element of the mold.

11. The decorative panel according to claim 10, wherein the at least one corresponding relief element is a recess.

12. The decorative panel according to claim 10, wherein the at least one corresponding relief element corresponds to the one or more patterns.

13. The decorative panel according to claim 10, wherein the one or more patterns comprise:
   a first pattern on the at least one corresponding relief element; and
   a second pattern on an area of the first layer adjacent to the at least one corresponding relief element, wherein the first pattern differs from the second pattern.

14. The decorative panel according to claim 1, wherein an area of the mold adjacent to the at least one relief element has a flat surface.

15. The decorative panel according to claim 1, wherein the mold has a textured surface.

16. The decorative panel according to claim 1, wherein the first layer has a thickness of 0.01 to 0.02 inch.

17. The decorative panel according to claim 1, wherein the first layer includes a photoinitiator.

18. The decorative panel according to claim 1, wherein the first layer has a glossy finish.

19. The decorative panel according to claim 1, wherein the first layer has a matte finish.

20. The decorative panel according to claim 1, wherein the second layer is clear.

\* \* \* \* \*